(12) United States Patent
Manolakos et al.

(10) Patent No.: US 11,381,294 B2
(45) Date of Patent: *Jul. 5, 2022

(54) RATE MATCHING OF REFERENCE SIGNAL RESOURCES IN MULTIPLE TRANSMIT RECEIVE POINT (TRP) SCENARIOS

(71) Applicant: QUALCOMM Incorporated, San Diego, CA (US)

(72) Inventors: Alexandros Manolakos, Escondido, CA (US); Huilin Xu, San Diego, CA (US); Wanshi Chen, San Diego, CA (US); Heechoon Lee, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/037,159

(22) Filed: Sep. 29, 2020

(65) Prior Publication Data

US 2021/0013943 A1 Jan. 14, 2021

Related U.S. Application Data

(63) Continuation of application No. 16/532,164, filed on Aug. 5, 2019, now Pat. No. 10,790,892.

(30) Foreign Application Priority Data

Aug. 6, 2018 (GR) .............................. 20180100366

(51) Int. Cl.
*H04B 7/06* (2006.01)
*H04L 5/00* (2006.01)
(Continued)

(52) U.S. Cl.
CPC ......... *H04B 7/0626* (2013.01); *H04L 1/0013* (2013.01); *H04L 5/0048* (2013.01); *H04L 5/0057* (2013.01); *H04W 76/27* (2018.02)

(58) Field of Classification Search
CPC ..................................................... H04B 7/0626
(Continued)

(56) References Cited

U.S. PATENT DOCUMENTS 10,790,892 B2 * 9/2020 Manolakos ........... H04L 5/0073
2003/0147371 A1 8/2003 Choi et al.
(Continued)

OTHER PUBLICATIONS

Interdigital et al: "On CSI Acquisition for NR," 3GPP Draft; R1-1710928 CSI Acquisition, 3rd Generation Partnership Project (3GPP), Mobile Competence Centre; 650, Route Des Lucioles; F-06921 Sophia-Antipolis Cedex; France, vol. RAN WG1, No. Qingdao, P.R. China; Jun. 27, 2017-Jun. 30, 2017, Jun. 16, 2017, XP051304570, 4 Pages, Retrieved from the Internet: URL: http://www.3gpp.org/ftp/tsg_ran/WG1_RL1/TSGR1_AH/NR_AH_1706/Docs/ [retrieved on Jun. 16, 2017] sections 1 and 2.
(Continued)

*Primary Examiner* — Lihong Yu
(74) *Attorney, Agent, or Firm* — Patterson & Sheridan, LLP

(57) ABSTRACT

Certain aspects of the present disclosure provide techniques for rate matching PDSCH around NZP CSI RS transmissions in multi-TRP scenarios. In some cases, a network entity may signal a rate matching behavior to a user equipment (UE) for processing a physical downlink shared channel (PDSCH) configured with a first quasi co-location association and transmitted from a first transmission reception point (TRP) that potentially collides with one or more types of non-zero power (NZP) reference signals (RS) configured with a second quasi co-location association and transmitted from a second TRP using one or more resource sets.

29 Claims, 9 Drawing Sheets

(51) Int. Cl.
*H04L 1/00* (2006.01)
*H04W 76/27* (2018.01)

(58) Field of Classification Search
USPC .......................................................... 375/262
See application file for complete search history.

(56) References Cited

U.S. PATENT DOCUMENTS

| | | |
|---|---|---|
| 2013/0242902 A1 | 9/2013 | Liu et al. |
| 2015/0304995 A1 | 10/2015 | Yi et al. |
| 2016/0227519 A1 | 8/2016 | Nimbalker et al. |
| 2017/0034817 A1 | 2/2017 | Park et al. |
| 2017/0346598 A1 | 11/2017 | Robert Safavi et al. |
| 2018/0262975 A1 | 9/2018 | Martinez Tarradell et al. |
| 2020/0044712 A1 | 2/2020 | Manolakos et al. |

OTHER PUBLICATIONS

International Search Report and Written Opinion—PCT/US2019/045279—ISA/EPO—dated Nov. 7, 2019.
LG Electronics: "Discussion on Rate Matching," 3GPP Draft; R1-1715856 RMR, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep. 18, 2017-Sep. 21, 2017, Sep. 12, 2017, XP051329548, 8 Pages, Retrieved from the Internet: URL: http://www.3gpp.org/ftp/tsg_ran/WG1_RL1/TSGR1_AH/NR_AH_1709/Docs/ [retrieved on Sep. 12, 2017] p. 1-p. 2, p. 4-p. 5, p. 8.
QUALCOMM Incorporated: "On PDSCH and PUSCH RE Mapping," 3GPP Draft; R1-1716393, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep. 18, 2017-Sep. 21, 2017, Sep. 17, 2017, XP051339848, 4 pages, Retrieved from the Internet: URL: http://www.3gpp.org/ftp/Meetings_3GPP_SYNC/RAN1/Docs/ [retrieved on Sep. 17, 2017] sections 1, 2.1, 2.2; figure 1.

* cited by examiner

RATE MATCHING OF REFERENCE SIGNAL RESOURCES IN MULTIPLE TRANSMIT RECEIVE POINT (TRP) SCENARIOS

CLAIM OF PRIORITY

The present application is a continuation of U.S. application Ser. No. 16/532,164 filed Aug. 5, 2019, which claims benefit of Greek Patent Application Serial No. 20180100366, filed Aug. 6, 2018, which are assigned to the assignee hereof and hereby expressly incorporated by reference herein in their entireties.

INTRODUCTION

Aspects of the present disclosure relate to wireless communications, and more particularly, to techniques for rate matching around physical downlink shared channel (PDSCH) transmissions in scenarios with multiple transmit receive points (TRPs).

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment (UE). The method generally includes receiving a channel state information (CSI) reporting configuration associated with one or more resource sets for one or more types of non-zero power (NZP) reference signals (RS), receiving signaling indicating rate matching behavior for processing a physical downlink shared channel (PDSCH) configured with a first quasi co-location association and transmitted from a first transmission reception point (TRP) that potentially collides with NZP RS configured with a second quasi co-location association and transmitted from a second TRP using one of the resource sets, and processing the PDSCH transmission, wherein the processing comprises deciding whether or how to perform rate matching around the NZP RS based on the rate matching behavior.

Certain aspects provide a method for wireless communication by a network entity. The method generally includes transmitting, to a user equipment (UE), a channel state information (CSI) reporting configuration associated with one or more resource sets for one or more types of non-zero power (NZP) reference signals (RS) and signaling an indication of rate matching behavior for processing a physical downlink shared channel (PDSCH) configured with a first quasi co-location association and transmitted from a first transmission reception point (TRP) that potentially collides with NZP RS configured with a second quasi co-location association and transmitted from a second TRP using one of the resource sets.

Certain aspects of the present disclosure also provide various apparatus, means, and computer readable media capable of (or having instructions stored thereon for) performing the operations described above.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
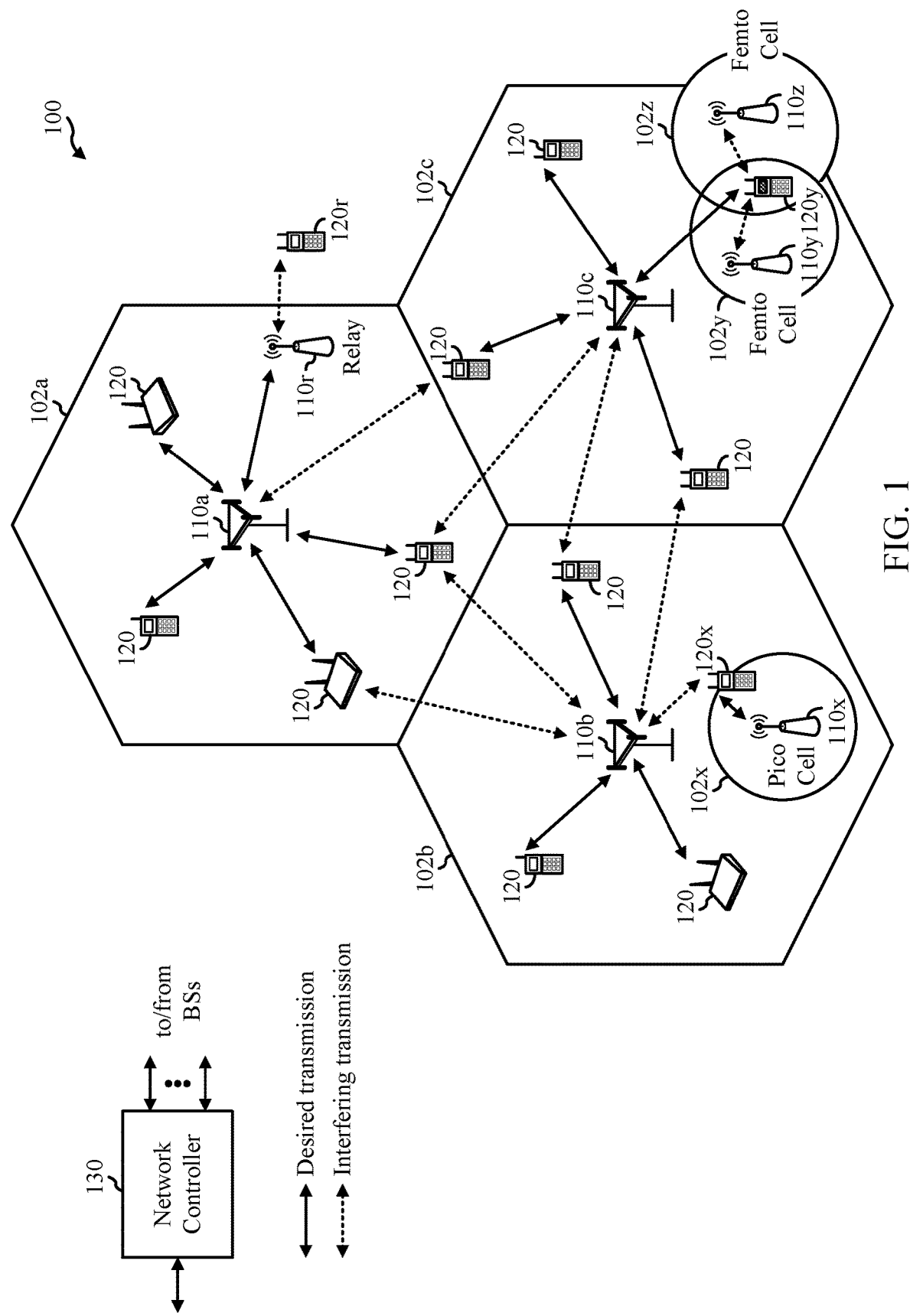
FIG. 1 is a block diagram conceptually illustrating an example telecommunications system, in accordance with certain aspects of the present disclosure.

Aspects of the present disclosure present disclosure provide apparatus, methods, processing systems, and computer readable mediums for rate matching of non-zero power (NZP) channel state information reference signal (CSI-RS) resources for channel or interference measurement in multiple transmit receive point (multi-TRP) scenarios.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. For example, BSs 110 may perform operation of FIG. 9 to configure a UE 120 to perform rate matching in accordance with the operations of FIG. 10.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things devices, which may be narrowband Internet-of-Things devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
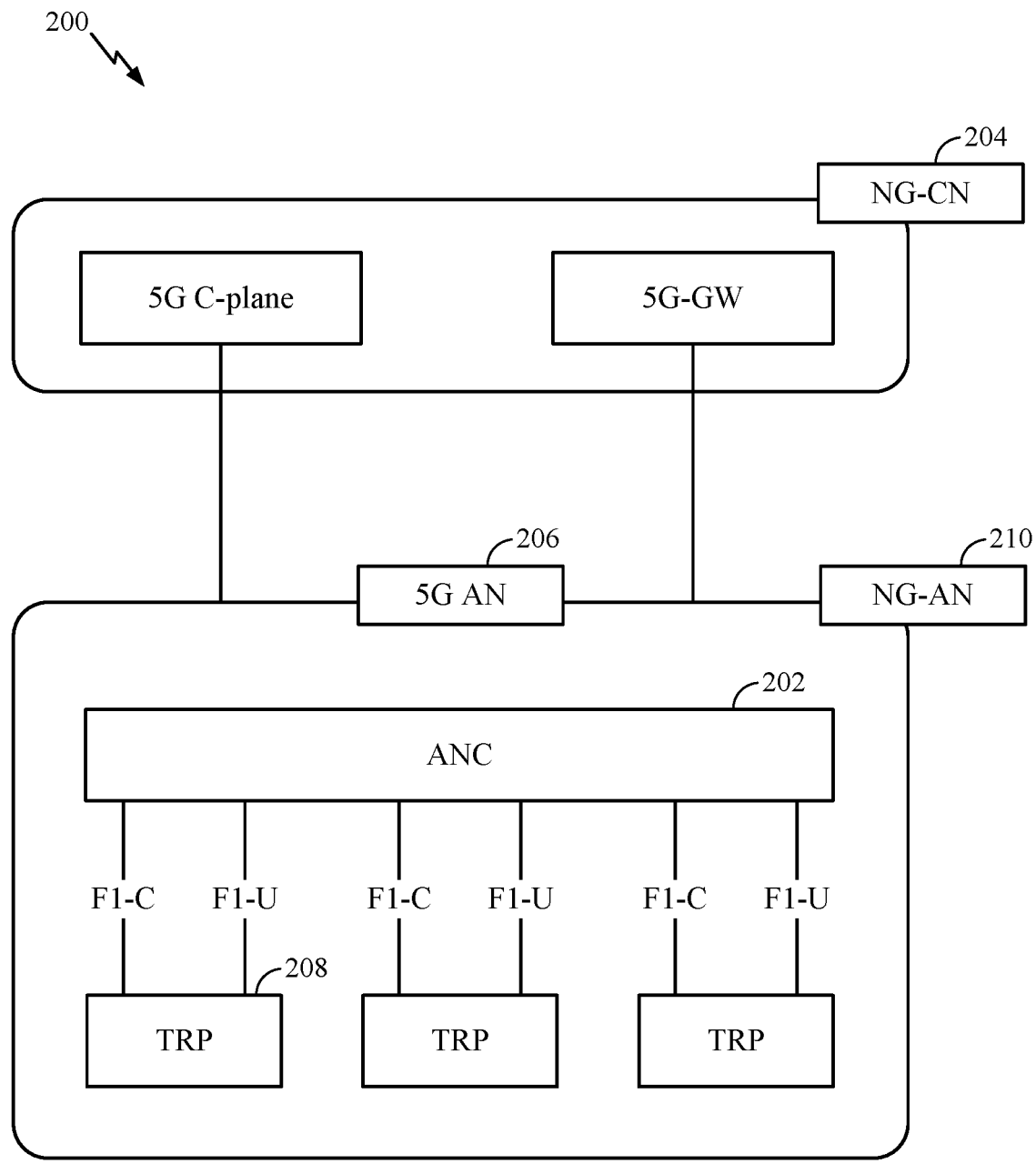
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
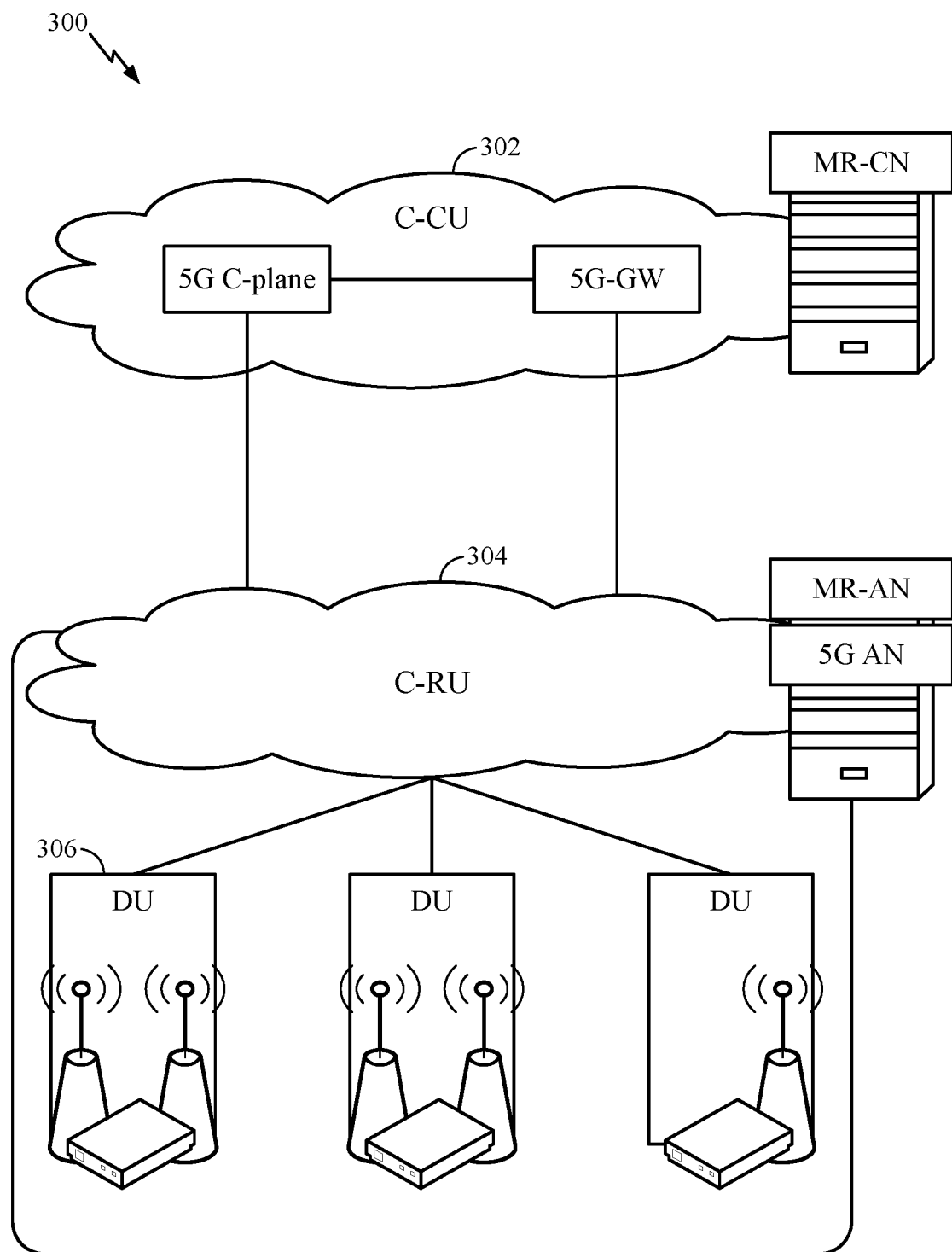
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
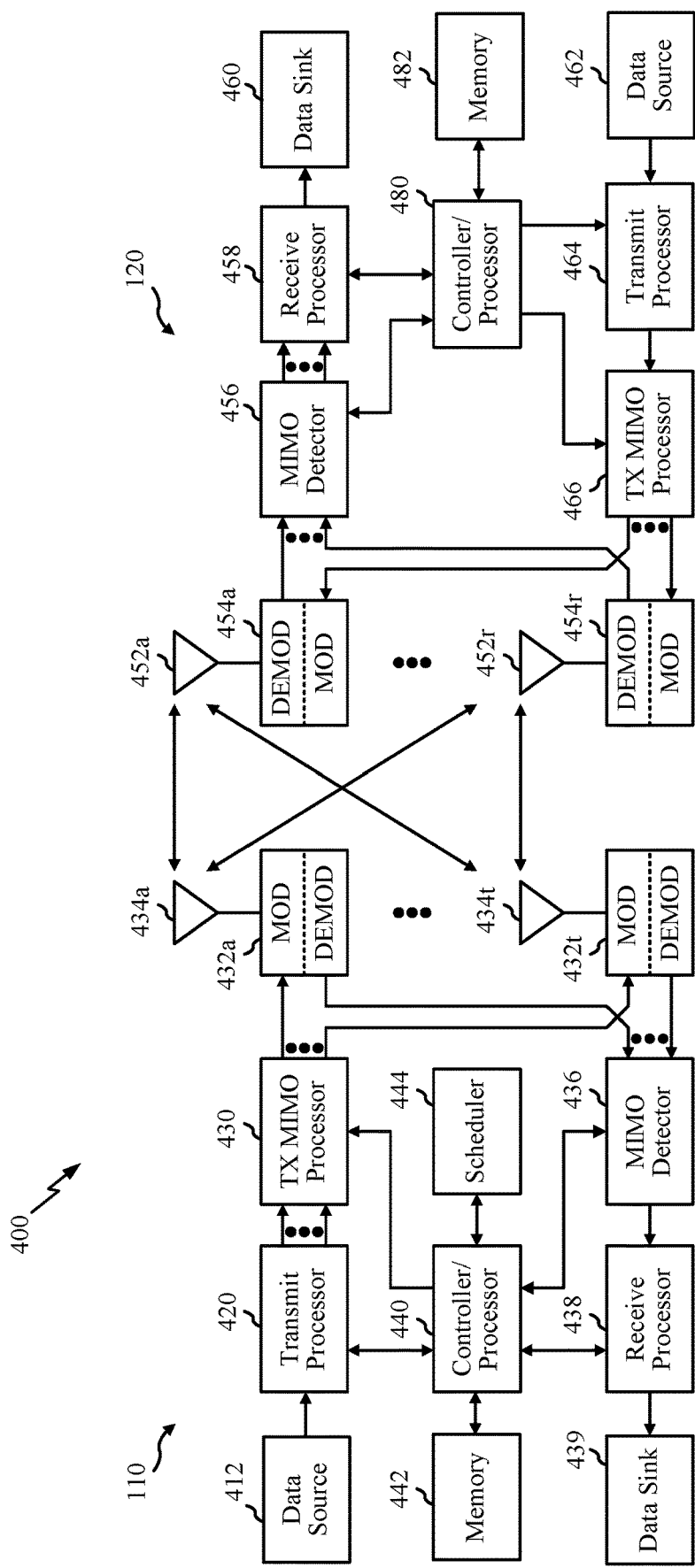
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 460, 438, and/or controller/processor 440 of the BS 110 may be used to perform the various techniques and methods described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
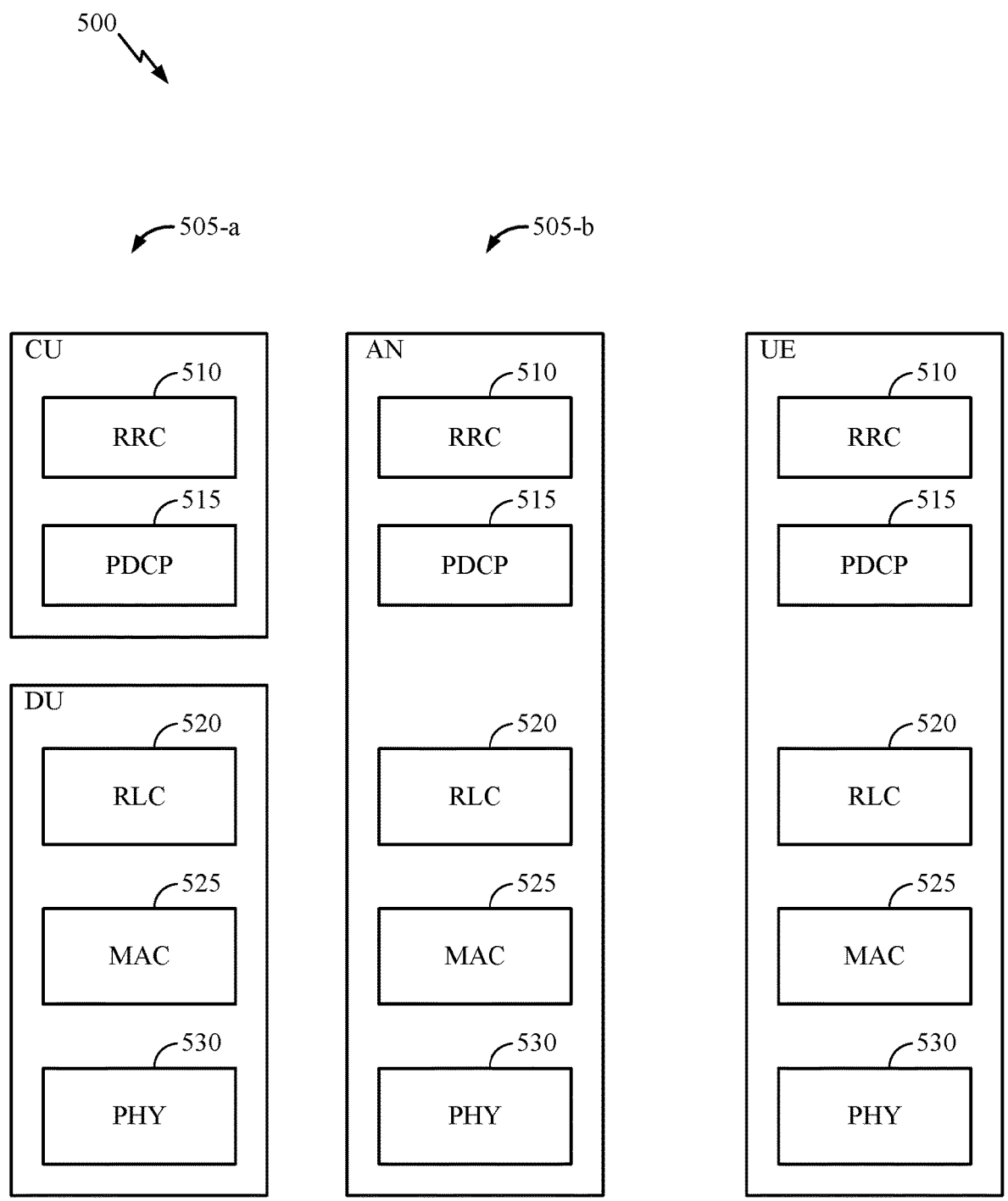
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, ... slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
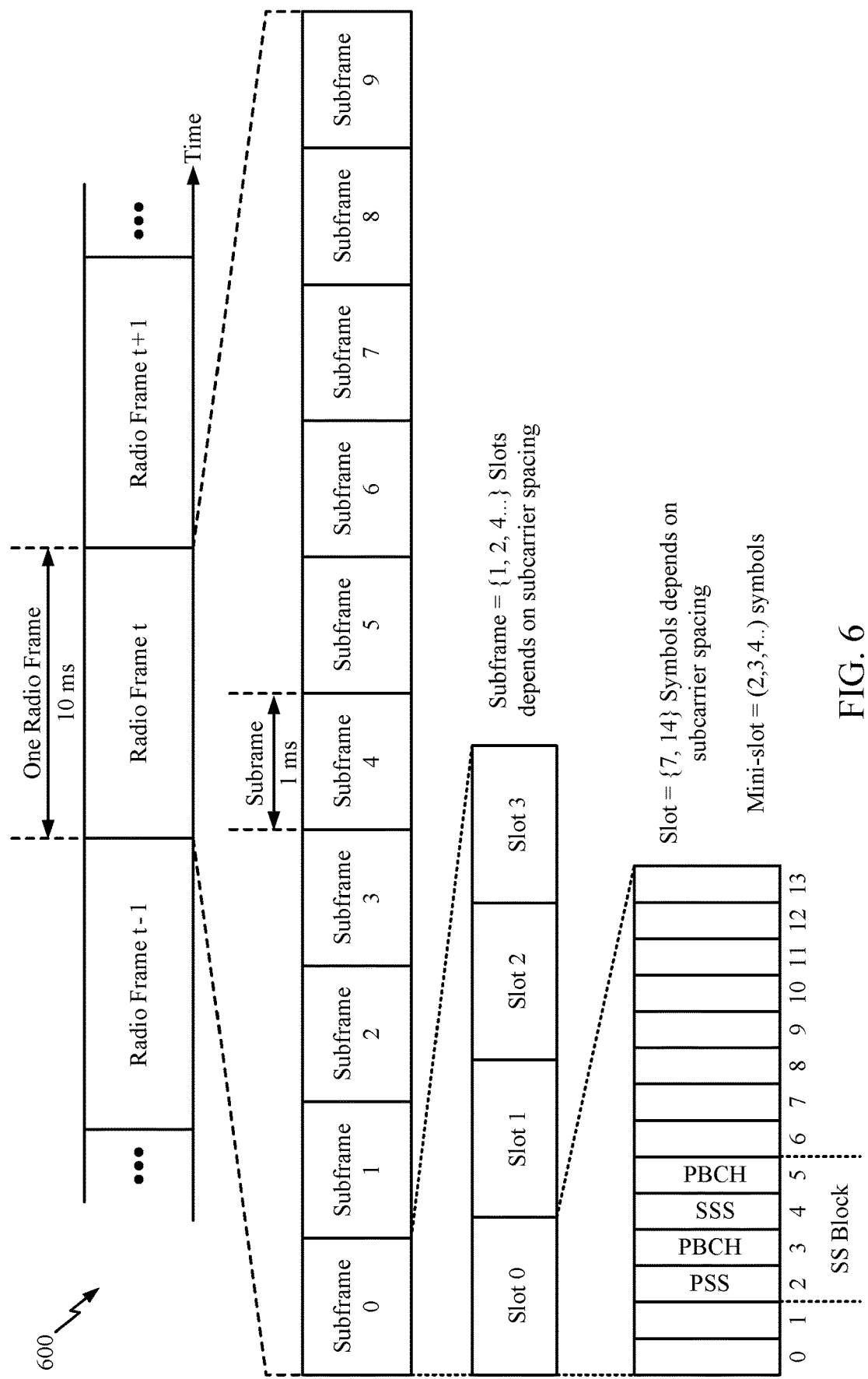
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal/physical broadcast channel (SS/PBCH) block is transmitted (also referred to as a synchronization signal block (SSB)). The SS/PBCH block includes a PSS, a SSS, and a two symbol PBCH. The SS/PBCH block can be transmitted in a fixed slot location, such as the symbols 2-5 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS/PBCH blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, Internet-of-Things communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Rate Matching of CSI-RS Resources for Channel or Interference Measurement in Multi-TRP Scenarios Advanced systems support multiple input multiple output (MIMO) communications via deployments with enhanced multiple transmit-receiver points (TRPs) and/or TRPs with multiple antenna panels.

Some enhancements on multi-TRP/multi-panel transmission include improved reliability and robustness with both ideal and non-ideal backhaul via various mechanisms, such as specifying downlink control signaling enhancement(s) for efficient support of non-coherent joint transmission (NCJT). Enhancements on uplink control signaling and reference signal(s) for non-coherent joint transmission may also be specified.

In some cases, for multi-TRP scenarios, different configurations exist for NR downlink channel reception. For example, a single NR-PDCCH may schedule a single NR-PDSCH, where separate layers are transmitted from separate TRPs. As another example, multiple NR-PDCCHs may each schedule a respective NR-PDSCH, where each NR-PDSCH is transmitted from a separate TRP. In the case of a single NR-PDCCH scheduling a single NR-PDSCH, each layer may be transmitted from all TRPs jointly, in a manner that is transparent to a standard specification. Various CSI feedback details for the above cases may be considered separately, for each case.

The use of non-zero power (NZP) CSI-RS resources is defined in NR, as a set of NZP CSI-RS port(s) mapped to a set of REs within a frequency span (time duration) which can be measured at least to derive a CSI. Multiple NZP CSI-RS resources can be configured for a UE, for example, for supporting multi-TRP and multiple beamformed CSI-RS based operations. Each NZP CSI-RS resource, at least for multi-TRP, can have a different number of CSI-RS ports.

In current systems, however, configurations may be limited, for example, such that all CSI-RS resources across all CSI-RS resource sets of a specific CSI resource configuration have the same number of ports. This limitation may arise in cases where only one codebook can be configured in each report configuration.

Figure 7:
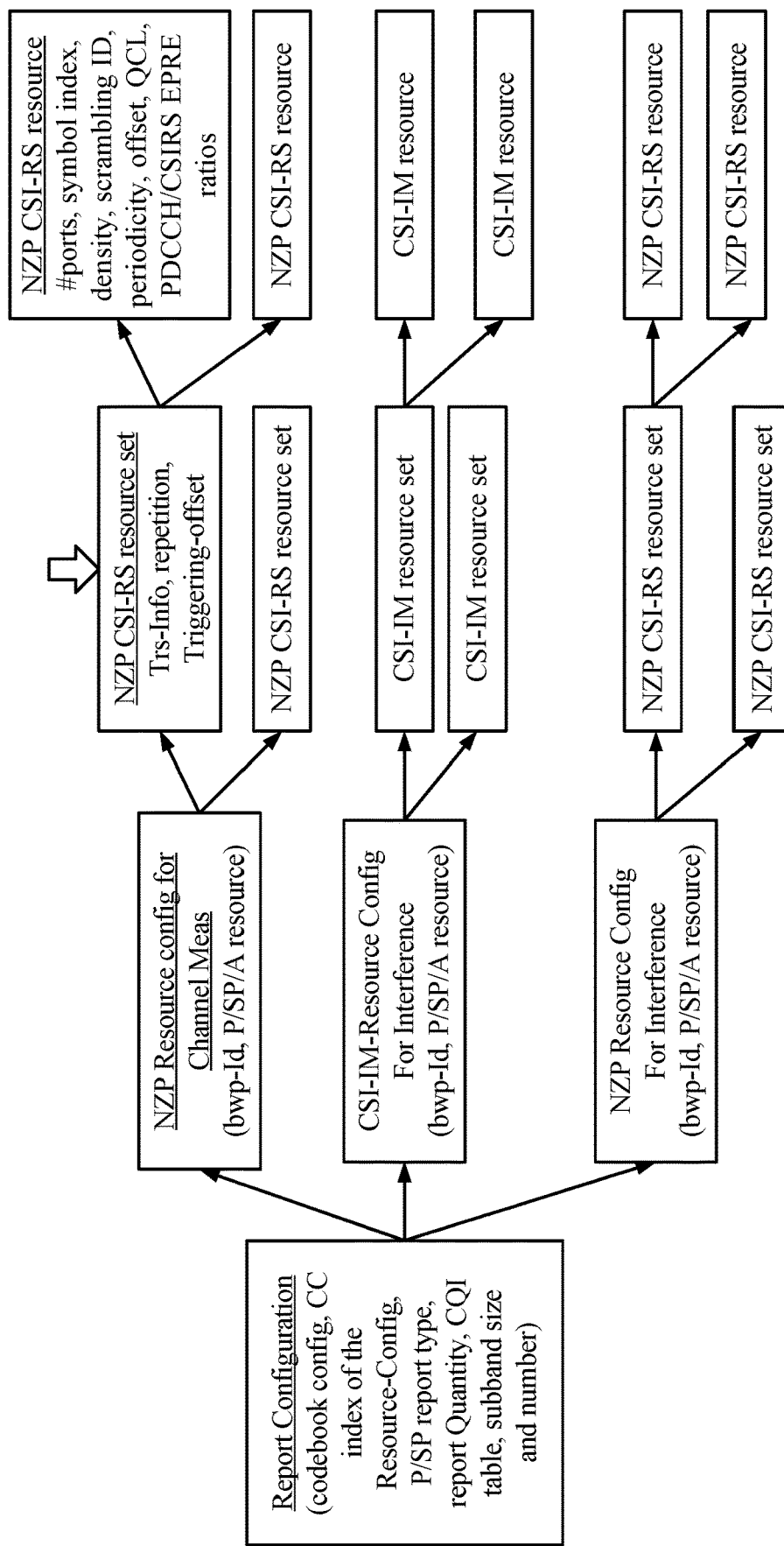
FIG. 7 illustrates an example view of CSI-RS report configuration, in accordance with certain aspects of the present disclosure.

FIG. 7 illustrates a high level view of a current CSI framework. For Periodic and semi-persistent report configurations, each resource configuration contains only one CSI-RS resource set. For aperiodic report triggering, each code point in the DCI can be associated with multiple report configurations, each report configuration associated with a resource configuration which may contain multiple CSI-RS resource sets (one of which is triggered).

In current systems, a UE is expected to rate match PDSCH around NZP CSI-RS resources for channel estimation or interference not used for mobility (RRM), as well as ZP CSI-RS resources. As used herein, the term rate matching generally refers to the basic function of matching the number of bits in a transport block (TB) to the number of bits that can be transmitted in the given resource allocation. In current systems, a UE is not expected to rate match PDSCH when the PDSCH transmission collides with an NZP CSI-RS resource for radio resource management (RRM) or CSI interference measurement (CSI-IM) resources.

One challenge for scenarios of multi-TRP deployments with a non-ideal backhaul (MB), is that the TRPs have relaxed requirements for backhaul exchange of scheduling information and synchronization. This may result in the following problem. When a first TRP triggers an Aperiodic NZP-CSI RS resource for channel or interference measurement (IM) estimation to a UE, another TRP may schedule a PDSCH to this same UE on colliding time/frequency resources. This situation may result from the NIB not allowing enough time for the TRPs to collaborate (share information) in order to perform rate matching correctly. Unfortunately, the UE may assume that rate-matching has happened when, in fact, it has not, leading effectively to "PDSCH puncturing" due to the collision.

Aspects of the present disclosure, however, may address this scenario by providing for configurable PDSCH rate matching behavior, for example, for NZP CSI-RS resources for channel or interference measurement purposes in multi-TRP scenarios. In some cases, a network may be allowed to configure NZP CSI RS resources for channel or interference measurement for which the UE is not expected to perform rate matching around PDSCH.

Figure 8:
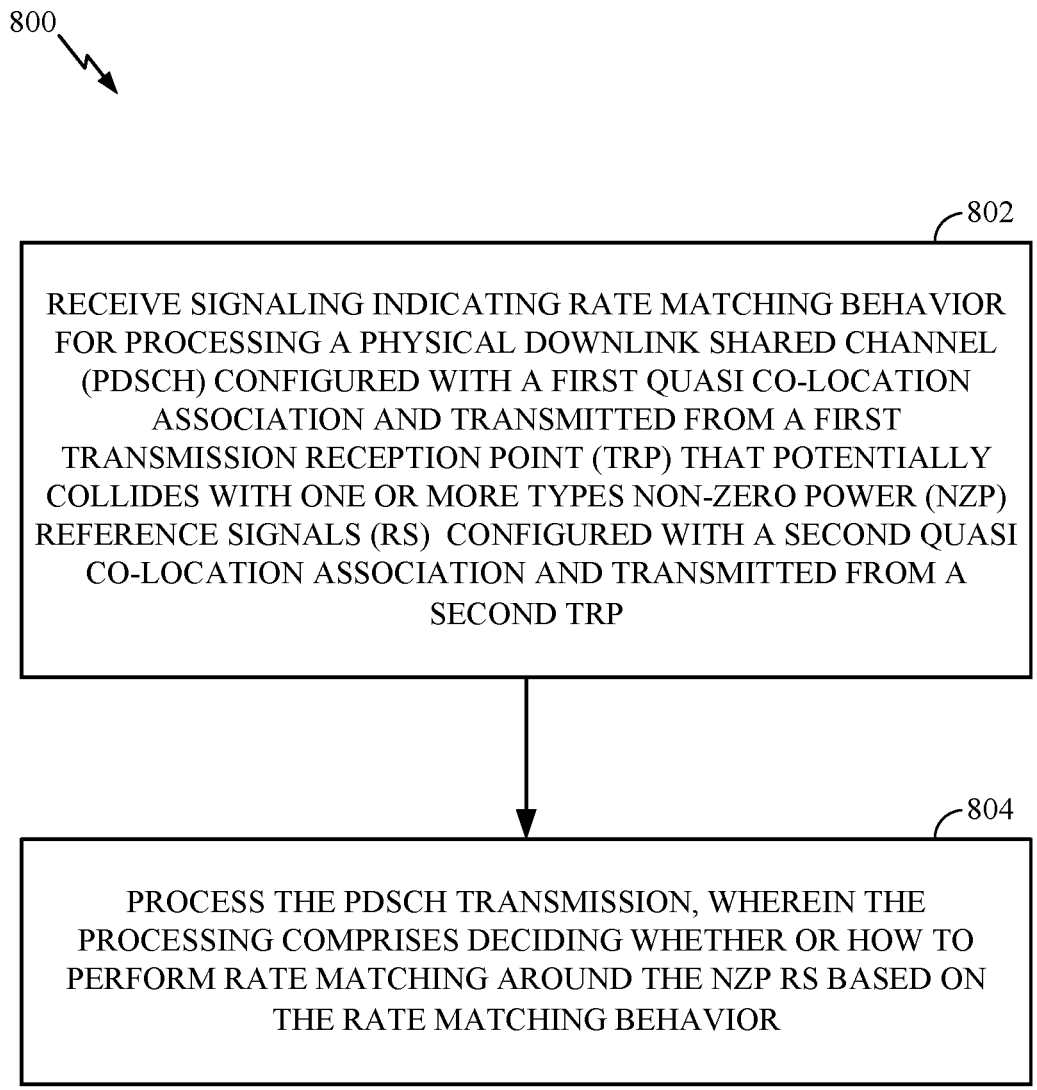
FIG. 8 illustrates example operations that may be performed by a user equipment (UE), in accordance with aspects of the present disclosure.

FIG. 8 illustrates example operations 800 for wireless communications by a user equipment (UE) to perform rate matching based on a signaled behavior, in accordance with aspects of the present disclosure. For example, operations 800 may be performed by a UE 120 shown in FIGS. 1 and 4.

Operations 800 begin, at 802, by receiving signaling indicating rate matching behavior for processing a physical downlink shared channel (PDSCH) configured with a first quasi co-location association and transmitted from a first transmission reception point (TRP) that potentially collides with NZP RS configured with a second quasi co-location association and transmitted from a second TRP using one of the resource sets. At 804, the UE processes the PDSCH transmission, wherein the processing comprises deciding whether or how to perform rate matching around the NZP RS based on the rate matching behavior.

Figure 9:
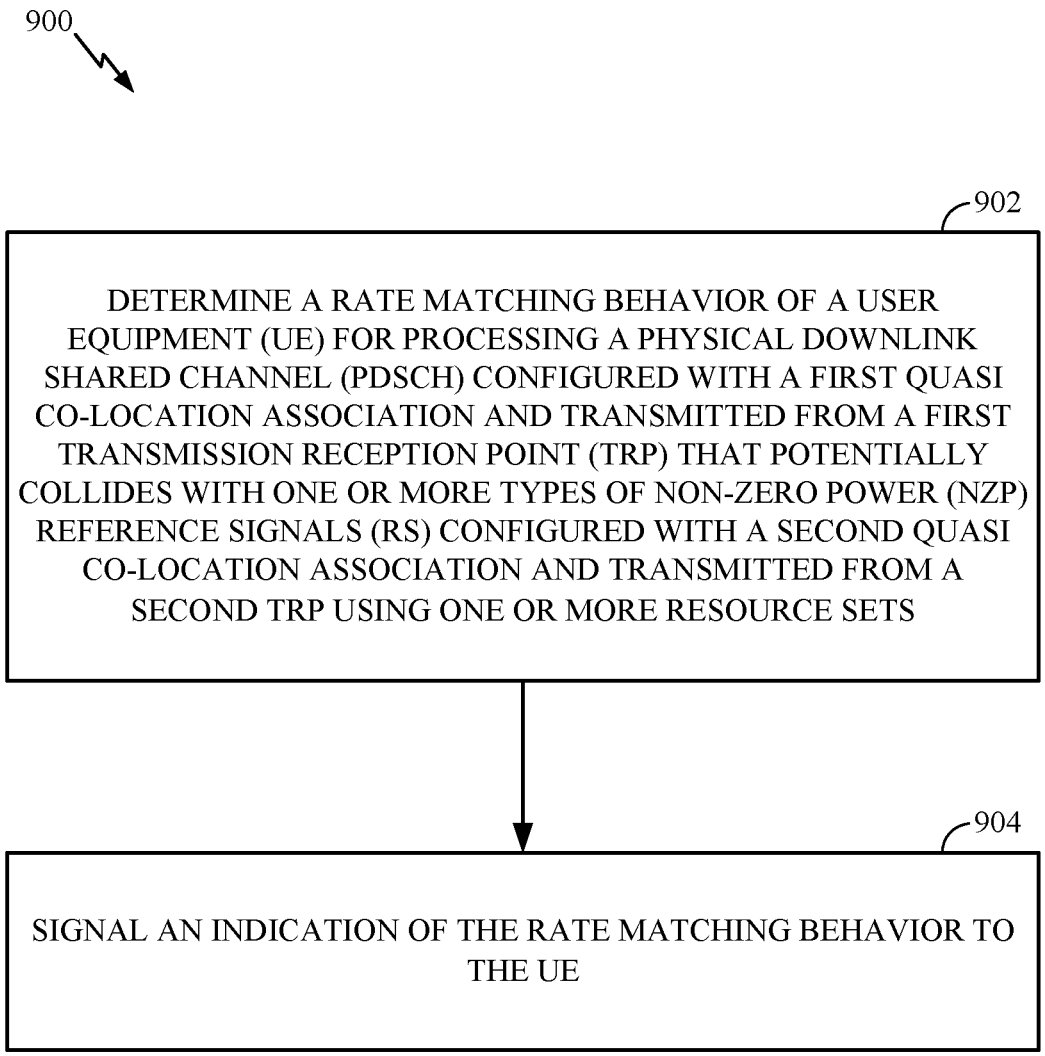
FIG. 9 illustrates example operations that may be performed by a network entity, in accordance with aspects of the present disclosure.

FIG. 9 illustrates example operations 900 for wireless communications by a network to signal a UE to perform rate matching according to a particular rate matching behavior, in accordance with aspects of the present disclosure. For example, operations 900 may be performed by a BS/gNB 110 shown in FIGS. 1 and 4 to configure a UE to perform rate matching according the operations of FIG. 8 described above.

Operations 900 begin, at 902, by determining a rate matching behavior for a UE for processing a physical downlink shared channel (PDSCH) configured with a first quasi co-location association and transmitted from a first transmission reception point (TRP) that potentially collides with one or more types of NZP RS configured with a second quasi co-location association and transmitted from a second TRP using one of the resource sets. The one or more types of NZP RS may be CSI-RS for various purposes, such as IM or RRM, or NZP RS for positioning or tracking purposes. At 904, the network entity signals the rate matching behavior to the UE.

As noted above, the techniques presented herein may allow a network to configure NZP CSI RS resources for channel or interference measurement for which the UE is not currently expected to PDSCH rate match around. The signaling of a rate matching behavior may be accomplished in various manners.

For example, in a radio resource control (RRC)-based solution, each NZP CSI-RS resource for channel or interference purposes may have an RRC parameter or "flag" which controls whether the UE is supposed to rate match or not.

This flag may be allowed to be configured as 'Not-Rate-Match', for example, when this CSI RS resource is configured from a non-serving cell. This may make sense, for example, if the decision of transmitting PDSCH and transmitting a CSI RS is happening at the same scheduling unit (e.g., the serving TRP). In this case, there may be no problem (as the serving TRP may schedule accordingly).

In some cases, this flag may be optionally configured, with a UE configured to perform a default behavior if it is not signaled this flag. For example, default behavior may be the "legacy" behavior of NR rel-15, to rate match PDSCH around NZP CSI RS, otherwise if configured it would mean 'Not-Rate-Match.'

In some cases, this flag may only be allowed to be configured for NZP CSI RS resources configured aperiodically. In some cases, this flag may only be allowed to be configured for resources that are supposed to be used for interference measurement.

For any aperiodic NZP CSI RS resource (either channel or interference purposes) configured by a non-serving cell, the UE may not be expected to rate match PDSCH. This may be similar to treatment of NZP CSI RS resources for radio resource management (RRM). The network should be allowed to configure NZP CSI RS resources for channel or interference measurement for which the UE is not expected to PDSCH rate match around them.

In some cases, there may be a semi-static configuration of a list which contains, for each cell-ID, (or quasi-colocation "QCL" association), a corresponding rate matching behavior, that indicates how a UE should perform rate matching if a CSI RS is transmitted from this cell-ID or QCL.

As an alternative to RRC-based solutions, in DCI-based solutions, each code point of the aperiodic triggering list may be associated with a list of bits of the size of the NZP CSI RS resource triggered by this code point. These bits, in effect, signal to the UE whether or not it should rate match around the corresponding CSI RS resources.

In some cases, additional bits in the scheduling DCI signal may be related to PDSCH rate matching of NZP CSI RS resources, for example, the aperiodic CSI RS resources appearing inside the same time/frequency resources as the schedule PDSCH. In some cases, for all the resource elements of indicated OFDM symbols (e.g., PDSCH may appear on symbol 2-10, but another TRP transmits on symbol 8, due to synchronization uncertainty of +−1 symbol), the scheduling TRP may ask the UE to rate match certain symbols (e.g., 7, 8, and 9) to avoid collision with PDSCH. On the other hand, the scheduling TRP may ask that the UE not rate match any symbol, since the scheduling TRP may not know whether this CSI RS is also triggered or not in this slot.

In a media access control (MAC) control element (MAC-CE) based solution, a UE may be configured, via a MAC-CE, with the rate matching behavior of each aperiodic NZP CSI RS resource in each triggering state. In some cases, a MAC-CE may configure a list which contains, for each cell-ID, (or QCL association), the corresponding rate matching behavior, if a CSI RS is transmitted from this cell-ID or QCL.

In some cases, due to time-domain synchronization uncertainty, the network may be allowed to configure a rate matching behavior which extends longer in time around NZP CSI RS resources for channel or interference measurement. For example, a scheduling TRP may want to avoid PDSCH collisions with CSI RS resources from another TRP in certain scenarios, for example, for users with strict reliability requirements. In such cases, a scheduling TRP may configure a time-domain window (a measurement gap) around a CSI RS resource, where this window is configured per CSI RS resource.

If such a window is not configured, a default assumption may be that the UE rate matches according to the legacy behavior. In some cases, such a window may be allowed to be configured for one type of NZP RS, but not another. For example, such a window may be allowed to be configured for NZP CSI RS resources for interference measurement, but not for CSI RS resources for channel measurement. In some cases, such a window may be configured per cell-ID, or per QCL assumption. In such cases, rate matching behavior may be inherited for any NZP CSI RS resource associated with this cell-ID or QCL.

According to one solution, bits may be added in the DCI to signal a window for which rate matching behavior applies. For example, each DCI code point may point to a different size of measurement gap. For 2 bits of DCI, the rate matching behavior (and window) may be applied as follows:

'00'—>Re-level rate matching around the CSI RS resource (this may also be a default behavior or the behavior if bits are not configured);

'01'—>any symbol containing this CSI RS resource are rate matched;

'10'—>any symbol containing this CSI RS resource plus one before and one after are rate matched; or '11'—>any symbol containing this CSI RS resource plus two before and two after are rate matched.

As noted above, the rate matching techniques may be applied to NZP RS used for a variety of different purposes, such as NZP RS used for channel tracking purposes (TRS) or NZP RS used for positioning purposes (PRS).

The rate matching techniques described above may or may not be applied in specific multi-TRP scenarios. For example, in multi-TRP cases where it is likely that TRPs are well-synchronized on an "ideal" backhaul, it may not be as critical to allow the above solutions. Examples of these multi-TRP cases include:

1 PDCCH schedules 1 PDSCH (different layers from different TRPs); or

2 PDCCHs schedules the same (1) PDSCH: PDCCH repetition.

On the other hand, for multi-TRP cases where it is likely that TRPs are not well-synchronized (e.g., a "non-ideal" backhaul, it may be more important that the above solutions be allowed. Examples of these multi-TRP cases include:

2 PDCCHs scheduling 2 respective PDSCHs (e.g., same TB, same HARQ process): PDSCH repetition;

2 PDCCHs schedule 2 respective PDSCHs (different TB, different HARQ processes);

1 PDCCH schedules 2 PDSCHs (same TB, same HARQ process): PDSCH repetition; or

1 PDCCH schedules 2 PDSCH (single TB, different CB, same HARQ process).

In some cases, the rate matching techniques described herein may be applied to scenarios of PDSCH slot aggregation. For example, rate matching behavior may be indicated to specify whether rate matching is done only on the first slot, or all slots in an aggregated transmission. Whether or not to apply rate matching, and on which slots, may depend on an actual configured periodicity. In general, depending on the periodicity, which instance of CSI RS is rate-matched may depend on whether there is PDSCH slot aggregation. For example, if CSI RS is configured in every slot, when there is PDSCH slot aggregation, the CSI RS may be rate matched only on a subset of the slots (e.g., first slot).

In some cases, the rate matching behavior to apply in which slots may be explicitly indicated. For example, this explicit signaling may be provided via MAC CE or RRC signaling. For example, RRC signaling may configure several sets of CSI-RS applicability for rate matching where each set covers all slots and a DCI transmission may be used to indicate which set to use. Signaling may also be provided via DCI, for example, via a bitmap used to indicate the slots for rate matching applicability. In some cases, a combination of these (MAC CE, RRC, and/or DCI) signaling approaches may be used to indicate the slots for rate matching applicability.

Example Embodiments

Embodiment 1: A method of wireless communications by a user equipment (UE), comprising receiving signaling indicating rate matching behavior for processing a physical downlink shared channel (PDSCH) configured with a first quasi co-location association and transmitted from a first transmission reception point (TRP) that potentially collides with one or more types non-zero power (NZP) reference signals (RS) configured with a second quasi co-location association and transmitted from a second TRP and processing the PDSCH transmission, wherein the processing comprises deciding whether or how to perform rate matching around the NZP RS based on the rate matching behavior.

Embodiment 2: The method of Embodiment 1, wherein the rate matching behavior is signaled only for NZP RS resources configured aperiodically, for NZP RS resources used for interference measurement, for NZP RS resources used for channel measurement, or a combination thereof.

Embodiment 3: The method of any of Embodiments 1-2, wherein the rate matching behavior is signaled via radio resource control (RRC) signaling of a parameter that indicates whether the UE is supposed to perform rate matching or not.

Embodiment 4: The method of Embodiment 3, wherein the UE is configured to process the PDSCH according to a default behavior if the parameter is not signaled.

Embodiment 5: The method of any of Embodiments 1-4, wherein the signaling comprises receiving a semi-static configuration of a list which indicates, for each of a plurality of cell-IDs or quasi co-location (QCL) associations, a corresponding rate matching behavior, if NZP RS is transmitted from that cell-ID or QCL association.

Embodiment 6: The method of any of Embodiments 1-5, wherein the rate matching behavior is signaled via a downlink control information (DCI) transmission that triggers aperiodic transmission of NZP RS on one or more of the resource sets and different code points of the DCI are associated with different rate matching behaviors for NZP RS transmitted on a corresponding set of resources.

Embodiment 7: The method of any of Embodiments 1-6, wherein the rate matching behavior is signaled via one or more bits in a downlink control information (DCI) transmission that triggers aperiodic transmission of NZP RS on one or more of the resource sets that at least partially overlap with resources used for the PDSCH.

Embodiment 8: The method of any of Embodiments 1-7, wherein the rate matching behavior is signaled via a media access control (MAC) control element.

Embodiment 9: The method of Embodiment 8, wherein the MAC-CE indicates a rate matching behavior for each aperiodic NZP RS resource in each triggering state or includes a list which contains, for each cell-ID or quasi co-location (QCL) association, a corresponding rate matching behavior if NZP RS is transmitted from that corresponding cell-ID or QCL association.

Embodiment 10: The method of any of Embodiments 1-9, wherein signaling of the rate matching behavior comprises signaling a configurable time window, per resource set, within which the rate matching behavior should be applied.

Embodiment 11: The method of any of Embodiments 1-10, wherein a configurable window is signaled for each cell-ID or quasi co-location (QCL) association in which NZP RS may be transmitted.

Embodiment 12: The method of Embodiment 11, wherein a duration of the window is signaled via downlink control information (DCI) bits.

Embodiment 13: The method of any of Embodiments 1-12, wherein the NZP RS for which rate matching behavior is signaled comprises at least one of NZP RS used for channel tracking purposes or NZP RS used for positioning purposes.

Embodiment 14: The method of any of Embodiments 1-13, wherein rate matching behavior is signaled for only certain multi-TRP configurations, wherein each multi-TRP configuration specifies a number of physical downlink control channels (PDCCHs) associated with the number of PDSCHs.

Embodiment 15: The method of any of Embodiments 1-14, wherein the PDSCH transmission is sent using PDSCH slot aggregation and the UE is configured to determine for which slots the rate matching behavior is to be applied.

Embodiment 16: A method of wireless communications by a network entity, comprising determining a rate matching behavior of a user equipment (UE) for processing a physical downlink shared channel (PDSCH) configured with a first quasi co-location association and transmitted from a first transmission reception point (TRP) that potentially collides with one or more types of non-zero power (NZP) reference signals (RS) configured with a second quasi co-location association and transmitted from a second TRP using one or more resource sets and signaling an indication of the rate matching behavior to the UE.

Embodiment 17: The method of Embodiment 16, wherein the rate matching behavior is signaled only for NZP RS resources configured aperiodically, for NZP RS resources used for interference measurement, for NZP RS resources used for channel measurement, or a combination thereof.

Embodiment 18: The method of any of Embodiments 16-17, wherein the rate matching behavior is signaled via radio resource control (RRC) signaling of a parameter that indicates whether the UE is supposed to perform rate matching or not.

Embodiment 19: The method of Embodiment 18, wherein the UE is configured to process the PDSCH according to a default behavior if the parameter is not signaled.

Embodiment 20: The method of any of Embodiments 16-19, wherein the signaling comprises signaling a semi-static configuration of a list which indicates, for each of a plurality of cell-IDs or quasi co-location (QCL) associations, a corresponding rate matching behavior, if NZP RS is transmitted from that cell-ID or QCL association.

Embodiment 21: The method of any of Embodiments 16-20, wherein the rate matching behavior is signaled via a downlink control information (DCI) transmission that triggers aperiodic transmission of NZP RS on one or more of the resource sets and different code points of the DCI are associated with different rate matching behaviors for NZP RS transmitted on a corresponding set of resources.

Embodiment 22: The method of any of Embodiments 16-21 wherein the rate matching behavior is signaled via one or more bits in a downlink control information (DCI) transmission that triggers aperiodic transmission of NZP RS on one or more of the resource sets that at least partially overlap with resources used for the PDSCH.

Embodiment 23: The method of any of Embodiments 16-22, wherein the rate matching behavior is signaled via a media access control (MAC) control element.

Embodiment 24: The method of Embodiment 23, wherein the MAC-CE indicates a rate matching behavior for each aperiodic NZP RS resource in each triggering state or includes a list which contains, for each cell-ID or quasi co-location (QCL) association, a corresponding rate matching behavior if NZP RS is transmitted from that corresponding cell-ID or QCL association.

Embodiment 25: The method of any of Embodiments 16-24, wherein signaling of the rate matching behavior comprises signaling a configurable time window, per resource set, within which the rate matching behavior should be applied.

Embodiment 26: The method of any of Embodiments 16-25, wherein the NZP RS for which rate matching behavior is signaled comprises at least one of NZP RS used for channel tracking purposes or NZP RS used for positioning purposes.

Embodiment 27: The method of any of Embodiments 16-26, wherein rate matching behavior is signaled for only certain multi-TRP configurations, wherein each multi-TRP configuration specifies a number of physical downlink control channels (PDCCHs) associated with the number of PDSCHs.

Embodiment 28: The method of claim 16-27, wherein the PDSCH transmission is sent using PDSCH slot aggregation and the UE is configured to determine for which slots the rate matching behavior is to be applied.

Embodiment 29: An apparatus for wireless communications by a user equipment (UE), comprising means for receiving signaling indicating rate matching behavior for processing a physical downlink shared channel (PDSCH) configured with a first quasi co-location association and transmitted from a first transmission reception point (TRP) that potentially collides with one or more types non-zero power (NZP) reference signals (RS) configured with a second quasi co-location association and transmitted from a second TRP and means for processing the PDSCH transmission, wherein the processing comprises deciding whether or how to perform rate matching around the NZP RS based on the rate matching behavior.

Embodiment 30: An apparatus for wireless communications by a network entity, comprising means for determining a rate matching behavior of a user equipment (UE) for processing a physical downlink shared channel (PDSCH) configured with a first quasi co-location association and transmitted from a first transmission reception point (TRP) that potentially collides with one or more types of non-zero power (NZP) reference signals (RS) configured with a second quasi co-location association and transmitted from a second TRP using one or more resource sets and means for signaling an indication of the rate matching behavior to the UE.

Embodiment 31: An apparatus for wireless communications by a user equipment (UE), comprising a receiver configured to receive signaling indicating rate matching behavior for processing a physical downlink shared channel (PDSCH) configured with a first quasi co-location association and transmitted from a first transmission reception point (TRP) that potentially collides with one or more types non-zero power (NZP) reference signals (RS) configured with a second quasi co-location association and transmitted from a second TRP and at least one processor configured to process the PDSCH transmission, wherein the processing comprises deciding whether or how to perform rate matching around the NZP RS based on the rate matching behavior.

Embodiment 32: An apparatus for wireless communications by a network entity, comprising at least one processor configured to determine a rate matching behavior of a user equipment (UE) for processing a physical downlink shared channel (PDSCH) configured with a first quasi co-location association and transmitted from a first transmission reception point (TRP) that potentially collides with one or more types of non-zero power (NZP) reference signals (RS) configured with a second quasi co-location association and transmitted from a second TRP using one or more resource sets and at least one transmitter configured to signal an indication of the rate matching behavior to the UE.

Embodiment 33: A computer readable medium having instructions stored thereon for receiving signaling indicating rate matching behavior for processing a physical downlink shared channel (PDSCH) configured with a first quasi co-location association and transmitted from a first transmission reception point (TRP) that potentially collides with one or more types non-zero power (NZP) reference signals (RS) configured with a second quasi co-location association and transmitted from a second TRP and processing the PDSCH transmission, wherein the processing comprises deciding whether or how to perform rate matching around the NZP RS based on the rate matching behavior.

Embodiment 34: A computer readable medium having instructions stored thereon for determining a rate matching behavior of a user equipment (UE) for processing a physical downlink shared channel (PDSCH) configured with a first quasi co-location association and transmitted from a first transmission reception point (TRP) that potentially collides with one or more types of non-zero power (NZP) reference signals (RS) configured with a second quasi co-location association and transmitted from a second TRP using one or more resource sets and signaling an indication of the rate matching behavior to the UE.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components. For example, various operations shown in FIGS. 8 and 9 may be performed by various processors shown in FIG. 4.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 9 and/or 11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communication, comprising:
at least one processor; and
a memory coupled to the at least one processor, wherein the at least one processor is configured to:
receive signaling of rate matching information for processing a physical downlink shared channel (PDSCH) transmission associated with a first quasi co-location (QCL) corresponding to a first transmission reception point (TRP), wherein a first set of non-zero power (NZP) reference signal (RS) resources is associated with a second QCL corresponding to a second TRP, wherein the rate matching information includes, for each of a plurality of cell identifiers (IDs) or QCLs, a respective rate matching behavior for respective NZP RS resources associated with each respective cell-ID or QCL of the plurality of cell-IDs or QCLs; and
process the PDSCH transmission, wherein to process the PDSCH transmission, the at least one processor is configured to determined whether or how to perform rate matching around the first set of NZP RS resources based on the rate matching information.

2. The apparatus of claim 1, wherein the signaling comprises medium access control (MAC) control element (CE) signaling.

3. The apparatus of claim 1, wherein the signaling comprises radio resource control (RRC) signaling.

4. The apparatus of claim 1, wherein the signaling is only for NZP RS resources configured aperiodically, for NZP RS resources used for interference measurement, for NZP RS resources used for channel measurement, or a combination thereof.

5. The apparatus of claim 1, wherein the signaling is only for certain multi-TRP configurations, and wherein each multi-TRP configuration specifies a number of physical downlink control channels (PDCCHs) associated with a number of PDSCHs.

6. The apparatus of claim 1, wherein the at least one processor is configured to receive signaling of a configurable time window associated with rate matching.

7. The apparatus of claim 1, wherein the at least one processor is configured to receive signaling of a respective configurable time window associated with rate matching for each respective cell-ID or QCL of the plurality of cell-IDs or QCLs.

8. The apparatus of claim 6, wherein downlink control information (DCI) includes information indicative of a duration of the configurable time window.

9. The apparatus of claim 1, wherein the at least one processor is configured to:
determine which slots of the PDSCH transmission to perform the rate matching.

10. The apparatus of claim 1, wherein the respective rate matching behavior for the respective NZP RS resources associated with each respective cell-ID or QCL of the plurality of cell-IDs or QCLs is included in a list.

11. A method of wireless communication performed by a network entity, comprising:
determining rate matching information for a user equipment (UE) to process a physical downlink shared channel (PDSCH) transmission associated with a first quasi co-location (QCL) corresponding to a first transmission reception point (TRP), wherein a first set of non-zero power (NZP) reference signal (RS) resources is associated with a second QCL corresponding to a second TRP; and
sending signaling to the UE of the rate matching information, wherein the rate matching information includes, for each of a plurality of cell-identifiers (IDs) or QCLs, a respective rate matching behavior for respective NZP RS resources associated with each respective cell-ID or QCL of the plurality of cell-IDs or QCLs.

12. The method of claim 11, wherein the signaling comprises medium access control (MAC) control element (CE) signaling.

13. The method of claim 11, wherein the rate matching information indicates whether or how to perform rate matching.

14. The method of claim 11, wherein the signaling comprises radio resource control (RRC) signaling.

15. The method of claim 11, wherein the signaling is only for NZP RS resources configured aperiodically, for NZP RS resources used for interference measurement, for NZP RS resources used for channel measurement, or a combination thereof.

16. The method of claim 11, wherein the signaling is only for certain multi-TRP configurations, and wherein each multi-TRP configuration specifies a number of physical downlink control channels (PDCCHs) associated with a number of PDSCHs.

17. The method of claim 11, further comprising signaling a configurable time window associated with rate matching.

18. The method of claim 11, further comprising signaling a respective configurable time window associated with rate matching for each respective cell-ID or QCL of the plurality of cell-IDs or QCLs.

19. The method of claim 17, wherein a duration of the configurable time window is signaled via downlink control information (DCI) bits.

20. An apparatus for wireless communication, comprising:
at least one processor; and
a memory coupled to the at least one processor, wherein the at least one processor is configured to:
determine rate matching information for a user equipment (UE) to process a physical downlink shared channel (PDSCH) transmission associated with a first quasi co-location (QCL) corresponding to a first transmission reception point (TRP), wherein a first set of non-zero power (NZP) reference signal (RS) resources is associated with a second QCL corresponding to a second TRP; and
send signaling to the UE of the rate matching information, wherein the rate matching information includes, for each of a plurality of cell identifiers (IDs) or QCLs, a respective rate matching behavior for respective NZP RS resources associated with each respective cell-ID or QCL of the plurality of cell-IDs or QCLs.

21. The apparatus of claim 20, wherein the signaling comprises medium access control (MAC) control element (CE) signaling.

22. The apparatus of claim 20, wherein the rate matching information indicates whether or how to perform rate matching.

23. A method of wireless communication performed by an apparatus, comprising:
receiving signaling of rate matching information for processing a physical downlink shared channel (PDSCH) transmission associated with a first quasi co-location (QCL) corresponding to a first transmission reception point (TRP), wherein a first set of non-zero power (NZP) reference signal (RS) resources is associated with a second QCL corresponding to a second TRP, wherein the rate matching information includes, for each of a plurality of cell identifiers (IDs) or QCLs, a respective rate matching behavior for respective NZP RS resources associated with each respective cell-ID or QCL of the plurality of cell-IDs or QCLs; and
processing the PDSCH transmission, wherein the processing comprises determining whether or how to perform rate matching around the first set of NZP RS resources based on the rate matching information.

24. The method of claim 23, wherein the signaling comprises medium access control (MAC) control element (CE) signaling.

25. The method of claim 23, wherein the signaling comprises radio resource control (RRC) signaling.

26. The method of claim 23, wherein the signaling is only for NZP RS resources configured aperiodically, for NZP RS resources used for interference measurement, for NZP RS resources used for channel measurement, or a combination thereof.

27. The method of claim 23, wherein the signaling is only for certain multi-TRP configurations, and wherein each multi-TRP configuration specifies a number of physical downlink control channels (PDCCHs) associated with a number of PDSCHs.

28. The method of claim 23, further comprising:
determining which slots of the PDSCH transmission to perform the rate matching.

29. The method of claim 23, wherein the respective rate matching behavior for the respective NZP RS resources associated with each respective cell-ID or QCL of the plurality of cell-IDs or QCLs is included in a list.

* * * * *